United States Patent [19]
Ariyan et al.

[11] 3,821,384
[45] June 28, 1974

[54] PHARMACEUTICAL COMPOSITIONS CONTAINING A 4-ARYL-2-(3-PYRIDYL) THIAZOLE AND METHODS OF USING SAME

[75] Inventors: Zaven S. Ariyan, Woodbury, Conn.; William A. Harrison, Guelph, Ontario, Canada

[73] Assignees: Uniroyal Inc., New York, N.Y.; Uniroyal Ltd., Montreal, Quebec, Canada

[22] Filed: Oct. 6, 1972

[21] Appl. No.: 295,501

[52] U.S. Cl............ 424/263, 260/294.81, 424/248

[51] Int. Cl............................................. A61k 27/00
[58] Field of Search .............. 424/263; 260/294.81

[56] References Cited
FOREIGN PATENTS OR APPLICATIONS
7,007,029  11/1970  Netherlands.............. 260/294.8 D

*Primary Examiner*—Stanley J. Friedman
*Attorney, Agent, or Firm*—Willard R. Sprowls, Esq.

[57] ABSTRACT

Certain 4-aryl-2-(3-pyridyl)thiazoles are useful as active agents for the central nervous system, e.g., possess anti-anxiety properties.

28 Claims, No Drawings

PHARMACEUTICAL COMPOSITIONS CONTAINING A 4-ARYL-2-(3-PYRIDYL)THIAZOLE AND METHODS OF USING SAME

CROSS REFERENCE TO RELATED APPLICATIONS

This application is related to and incorporates by reference the contents of application of Harrison et al., Ser. No. 140,571, filed May 5, 1971, and of our application Ser. No. 264,817, filed June 21, 1972.

BACKGROUND OF THE INVENTION

1. Field of the Invention

This invention relates to the use of certain 4-aryl-2-(3-pyridyl)thiazoles, all of said thiazoles being known compounds, as psychotherapeutic agents, particularly as anti-anxiety agents.

In one aspect, the invention is a method of reducing anxiety. In another aspect, the invention is directed to pharmaceutical compositions comprising certain 4-aryl-2-(3-pyridyl)-thiazoles. A further aspect relates to the use of certain of said thiazoles to induce a hypnotic state, or to reduce aggression, or as an analgesic.

2. Description of the Prior Art

Thiazole derivatives, including numerous pyridylthiazoles, are, of course, known.

French patent application FM0008423, for example, discloses certain thiazole derivatives as having anti-inflammatory activity. These compounds are structurally dissimilar to the compounds employed in the present invention in that they are all substituted in the pyridyl ring by a group such as =O, =S, —OR or —SR. The compounds employed in the present invention, on the other hand, do not contain any such groups in the pyridyl rings thereof.

Dutch patent application 70/07029 discloses a group of 2-(3-pyridyl)thiazolylacetic acid derivatives as having antiinflammatory activity.

The application of Harrison et al. noted above discloses a broad class of 2-(3-pyridyl)thiazoles and methods for preparing same. According to the application of Harrison et al., 2-(3-pyridyl)thiazoles are prepared by well-known methods of thiazole synthesis. Thus, in broad outline, as described in Harrison et al in greater detail, a thioamide of the formula:

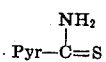

is reacted with an alpha-halocarbonyl compound of the formula:

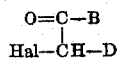

in the presence of a solvent such as alcohol with heating, followed by basification to form a compound of the formula:

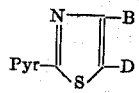

wherein Pyr is a pyridyl or an alkyl-substituted pyridyl group, B is an alkyl group, a carboxylate group or a carbamoyl group, D is, e.g., a carbamoyl or a mono- or di-substituted carbamoyl group and Hal is a halogen.

SUMMARY OF THE INVENTION

The present invention provides a method of reducing anxiety in an animal subject. This is achieved by administering to an animal subject a therapeutically effective amount of a specified 4-aryl-2-(3-pyridyl)thiazole or a pharmaceutically acceptable acid addition salt thereof.

The thiazole compounds that are employed in this invention may be represented by the following formula:

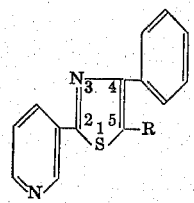

wherein R is

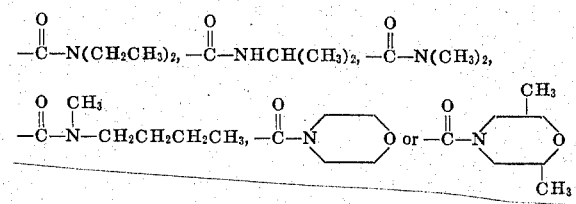

The foregoing thiazole compounds may also be employed in the form of their pharmaceutically acceptable acid addition salts, e.g. hydrochlorides, sulfates, hydrobromides, hydroiodides, sulfonates, and the like.

Generally, the amount of such thiazole that will be administered will be from about 0.1 to 300 mg/kg/day of body weight, preferably from about 50 to 200 mg/kg/day. In humans, the amount will be from about 0.4 to 4 mg/kg/day.

The invention further provides new pharmaceutical compositions comprising one of the above specified 4-aryl-2-(3-pyridyl)thiazoles.

Such pharmaceutical compositions comprise, in combination, a therapeutically effective amount of such a thiazole and a pharmaceutically acceptable carrier or diluent therefor.

For example, in the case of a tablet, the composition will comprise, in addition to the active ingredient, fillers, binders and diluents such as lactose, methylcellulose, talc, gum tragacanth, gum acacia, agar, polyvinylpyrrolidone, stearic acid and corn starch. In the case of a liquid suspension for oral administration, the composition will comprise, in addition to the active ingredients, a filler such as sodium carboxymethylcellulose and/or a syrup, e.g., a glycerine based syrup. In the case of a parenteral solution or suspension, the composition will comprise the active ingredient and a suitable liquid solvent or dispersant such as a saline solution.

DETAILED DESCRIPTION OF THE INVENTION

The thiazole compounds that are employed as psychotherapeutic agents in the present invention may be represented by the following formula:

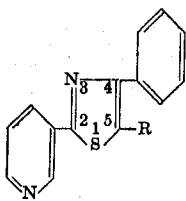

wherein R is

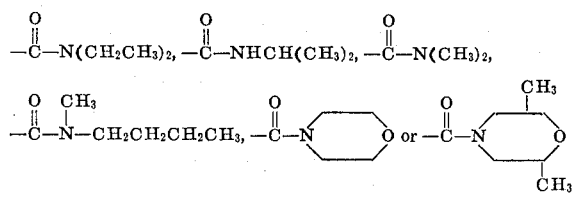

The foregoing thiazole compounds may also be employed in the form of their pharmaceutically acceptable acid addition salts, e.g., hydrochlorides, sulfates, hydrobromides, hydroiodides, sulfonates, and the like.

A preferred thiazole compound is N,N-dimethyl-4-phenyl-2-(3-pyridyl)-5-thiazolecarboxamide hydrochloride which is represented by the following formula:

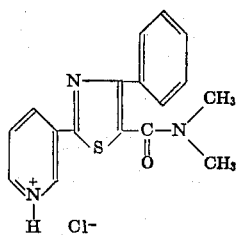

As indicated previously, the compounds of the present invention can be prepared by well known methods of thiazole synthesis such as the syntheses described in the application of Harrison et al. mentioned above as well as in our previously filed application Ser. No. 264,817. Thus, the compounds listed in Table 1 below were prepared indirectly from 4-phenyl-2-(3-pyridyl)-5-thiazolecarboxylic acid as described in our application Ser. No. 264,817, filed June 21, 1972.

The foregoing hydrochloride was studied in the Neuropharmacological Profile [see Samuel Irwin, *Science* 136, 123 (1962)], which is a standardized multidimensional observation technique used on mice to grade symptomatology and acute toxicity relative to dosage. As discussed in detail hereinafter, the hydrochloride was found to be a central nervous system depressant possessing anti-anxiety properties. Additionally, it possesses hypnotic, anti-aggressive, and analgesic properties. It is active orally in mice and rats and in these species has a therapeutic index with respect to hypnotic activity [ratio of mean lethal dose ($LD_{50}$) to mean effective dose ($ED_{50}$) or, in this particular case, mean hypnotic dose ($HD_{50}$)] of approximately 3. It is more selective than chlorpromazine or chlordiazepoxide in abolishing experimentally induced aggression in mice and rats. It does possess anti-convulsant activity, but in this respect is less active than chlordiazepoxide against maximal electro-shock seizures or seizures induced by pentylenetetrazol. It possesses weak analgesic activity as judged by its effect in the Haffner Tail Pinch method. (See Haffner, F., *Deut. Med. Wochenschrift*, 1929, 55, 731.) Thus, it appears to have potential as an anti-anxiety agent and as a minor tranquilizer possessing analgesic activity.

A considerable number of other 4-aryl-2-(3-pyridyl)thiazoles exhibited a Neuropharmacological Profile similar to that of N,N-dimethyl-4-phenyl-2-(3-pyridyl)-5-thiazole. The following table lists the various compounds which exhibited a desirable profile. In this table, the substituent R has reference to the following structural formula:

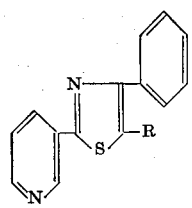

TABLE I

| Compound number | R | Yield (percent) | M.P. (° C.) |
|---|---|---|---|
| 1 | —CON(Et)$_2$ | 54 | 73–75 |
| 2 | —CONHCH(Me)$_2$ | 60 | 122–125 |
| 3 | —CON(Me)$_2$ | 68 | 121–123 |
| 4 | —CON(Me)$_2$ (hydrochloride)* | 58 | 212–217 |
| 5 | —CON(Me)—CH$_2$CH$_2$CH$_2$CH$_3$ | 42 | 64–66 |
| 6 | —CO—N(morpholino) | 15 | 140–142 |
| 7 | —CO—N(2,6-dimethylmorpholino) | 45 | 104–106 |

*Compound 4 is the hydrochloride of Compound 3.

NOTE: Me=—CH$_3$. Et=—CH$_2$CH$_3$.

An indicated, on the basis of preliminary screening in the Neuropharmacological Profile, each of the above tested thiazoles showed, inter alia, the ability to reduce anxiety.

The N,N-dimethyl-4-phenyl-2-(3-pyridyl)-5-thiazolecarboxamide hydrochloride (hereinafter referred to as the hydrochloride) was subjected to additional evaluation tests, as described below.

NEUROPHARMACOLOGICAL PROFILE

The hydrochloride was studied in the neuropharmacological profile, which, as mentioned previously, is a standardized multidimensional observation technique using mice to grade symptomatology and evaluate acute toxicity relative to dosage. Loss of righting reflex preceded by ataxia was the dominant symptom observed at the 300 mg/kg does level. Similar effects were noted at a dose level of 100 mg/kg; however, the loss of righting reflex was not only preceded by ataxia, but by hyporeflexia and analgesia. No loss of righting reflex was observed at a dose level of 30 mg/kg; however, there was complete loss of spontaneous motor activity accompanied by moderate depression and slight hyporeflexia and catatonia. Muscle relaxant symptoms were also noted at this dose level. No dominant signs or symptoms were observed at a dose level of 10 mg/kg. The onset of symptoms at 300 and 100 mg/kg dose levels occurred within two to three minutes and the effects lasted for approximately 60 minutes. At the lower dose levels, specifically 30 mg/kg, the loss of spontaneous motor activity was apparent 15 minutes after dosing and persisted for approximately 60 minutes. The results of additional testing, discussed in greater detail hereinafter, indicate that the hydrochloride is a CNS depressant with hypnotic, muscle relaxant, and analgesic properties.

HYPNOTIC ACTIVITY

Since loss of righting reflex was observed in the neuropharmacological profile assay, it was desirable to determine the effective median dose for the induction of the loss of righting reflex ($HD_{50}$). The hydrochloride was administered orally to mice in a dose range of 100 – 400 mg/kg. The calculated median hypnotic dose was 212.5 mg/kg, with 95% confidence limits of 150.5 – 335.5 mg/kg. The onset of the loss of righting reflex at 200 mg/kg dose level was less than two minutes and had a mean duration of 60 minutes. Similar studies were preformed in rats, with the hydrochloride being administered orally in a dose range of 200 – 300 mg/kg. The median hypnotic dose was calculated to be 249.5 mg/kg, with 95% confidence limits of 217.0 – 286.5 mg/kg. At this dose level, induction time for sleep was approximately 18 minutes and the loss of righting reflex persisted for approximately 25 minutes. No deaths occurred in the mice or rats tested at the doses which approximated the effective median doses.

NEUROTOXICITY ($NTD_{50}$)

In the neurotoxicity test, the value ($NTD_{50}$) is defined as the dose necessary to cause 50% of mice or rats trained to walk a rotating wooden rod (5rpm) to fall at the time of peak effect, and is a measure of drug effects on motor function or central nervous system toxicity. The results set forth in Table II were obtained when the hydrochloride was tested against chlorpromazine and chlordiazepoxide.

TABLE II

| | Neurotoxicity $NTD_{50}$ (mg/kg) | (95% Confidence Limits) |
|---|---|---|
| I.P.* | | Mice |
| The hydrochloride | 38 | (27.6–52.5) |
| Chlorpromazine | 0.7 | (0.4–1.1) |
| Chlordiazepoxide | 13.8 | (7.1–27.0) |
| P.O.** | | |
| The hydrochloride | 243 | (163.0–362.5) |
| Chlorpromazine | 12.1 | (8.5–17.3) |
| Chlordiazepoxide | 54 | (38.6–75.6) |
| I.P. | | Rats |
| The hydrochloride | 43.5 | (38.1–49.5) |
| Chlorpromazine | 5.3 | (3.1–9.1) |
| Chlordiazepoxide | 4.3 | (2.6–7.1) |
| P.O. | | |
| The hydrochloride | >60 | |
| Chlorpromazine | 11 | (6.1–19.9) |
| Chlordiazepoxide | 11.5 | (8.8–15.1) |

*Intraperitoneal
**Oral (per Os)

The time of peak effect for each agent in both species was 30 minutes after drug administration.

Chlorpromazine and chlordiazepoxide each produced considerably more neurotoxic signs and symptoms than were observed when using the hydrochloride.

ANTI-AGGRESSIVE ACTIVITY

The hydrochloride was compared with chlorpromazine and chlordiazepoxide for its anti-aggressive activity. Three models of experimentally-induced aggression in rodents were studied (R. D. Sofia, Life Science 8: 705, 1969). The results of these experiments are summarized in Table III.

TABLE III

| AGENT | Anti-Aggressive Activity $ED_{50}$ (95% Confidence Limits) (mg/kg) I.P. $ED_{50}$ | $NTD_{50}/ED_{50}$ |
|---|---|---|
| | Isolated Mouse Aggression | |
| The hydrochloride | 29.5 (15.8–54.9) | 1.3 |
| Chlorpromazine | 2.8 (2.0–3.9) | 0.3 |
| Chlordiazepoxide | 20.5 (11.3–37.5) | 0.7 |
| | Electroshock-Induced Fighting in Mice | |
| The hydrochloride | 38.2 (29.6–49.4) | 1.0 |
| Chlorpromazine | 5.5 (3.1–9.9) | 0.1 |
| Chlordiazepoxide | 4.2 (2.3–7.7) | 3.3 |
| | Septal Rat Aggression | |
| The hydrochloride | 26.0 (11.0–58.6) | 1.7 |
| Chlorpromazine | 10.7 (4.5–25.7) | 0.5 |
| Chlordiazepoxide | 25.8 (14.0–47.5) | 0.2 |

When considering the results of these studies, it should be understood that drug specificity is considered selective only when aggressive behavior is inhibited at doses which are significantly lower than those which impair rotarod performance ($NTD_{50}$) or result in a $NTD_{50}/ED_{50}$ ratio of greater than 1. Based on the above criterion, the hydochloride was active in antagonizing three models of aggressive behavior. Chlorpromazine and chlordiazepoxide were more potent than the hydrochloride in antagonizing isolated mouse aggression. However, when one correlates the dose necessary to block aggression with that which induces neurotoxicity, the hydrochloride is seen to be more selective in blocking aggression than either chlorpromazine or chlordiazepoxide. In fact, based on the above criterion, both chlorpromazine and chlordiazepoxide were nonselective in this test. The hydrochloride selectively blocked septal rat aggression and in this respect was equipotent with chlordiazepoxide. Based on the $NTD_{50}/ED_{50}$ ratio, the hydrochloride is four times more selective in blocking aggression than is chlordiazepoxide. Also in this test, both chlordiazepoxide and chlorpromazine were nonselective. Chlordiazepoxide was more selective in blocking electroshock-induced fighting in mice than either the hydrochloride or chlorpromazine.

ANTI-CONVULSANT ACTIVITY

Anti-convulsant activity was tested according to the following procedures:

1. MAXIMAL ELECTROSHOCK SEIZURES ($MES_{50}$)

Groups of 10 mice were injected i.p. with a vehicle and the test drug and placed in individual Plexiglas squares. Thirty minutes after i.p. injection, each mouse was administered an electric shock transcorneally at 50mA intensity, 0.2 seconds duration (Swinyard, et al., J. Pharmacol. Exptl. Ther. 106: 319, 1952). The criterion for activity is protection against tonic extension of the hind limbs. The dose necessary to protect 50% of the mice ($MES_{50}$) was determined. The following results were obtained.

TABLE IV

| Agent | Maximal Electroshock Seizures I.P. $MES_{50}$ mg/kg | |
|---|---|---|
| The hydrochloride | 64.0 | (55.6–73.4) |
| Chlorpromazine | Inactive | (25 mg/kg) |
| Chlordiazepoxide | 14.3 | (8.4 –24.3) |

The hydrochloride is effective in protecting against maximal electroshock seizures. However, chlordiazepoxide is four to five times more potent.

2. PENTYLENETETRAZOL SEIZURES ($MET_{50}$)

In this test (modification of the method introduced by Everett and Richard, J. Pharmacol. Exptl. Ther., 81: 402, 1944), groups of 10 mice each are pretreated i.p. with vehicle and various doses of test compound and placed in Plexiglas squares. Thirty minutes later, all mice are injected subcutaneously (s.c.) with pentylenetetrazol at 125 mg/kg and observed immediately thereafter for convulsions and death for a period of 1 hour. The dose necessary to protect 50% of the mice ($MET_{50}$) for both parameters was determined and reported in Table V.

TABLE V

| Agent | Pentylenetetrazol Seizures I. P. $MET_{50}$ mg/kg |
|---|---|
| The hydrochloride | 66.0 (46.2–94.1) Convulsions 43.2 (29.0–64.3) for death |
| Chlorpromazine | Inactive (100 mg/kg) |
| Chlordiazepoxide | 7.1 (5.6– 90) Convulsions 2.6 (2.2–3.1) for death |

The hydrochloride antagonizes the convulsions induced by pentylenetetrazol. However, it is less potent than chlordiazepoxide.

3. THIOSEMICARBAZIDE CONVULSIONS

Seizures were produced in mice by the administration of 20 mg/kg i.p. of thiosemicarbazide (TSC). Thirty minutes later, the hydrochloride was given at 100 and 200 mg/kg i.p. Four hours later, following TSC administration, the hydrochloride had not protected the mice from convulsions and death.

4. STRYCHNINE CONVULSIONS

The hydrochloride was studied for its possible antagonism to convulsions and death induced by the i.p. administration of 3 mg/kg of strychnine. It was administered i.p. 30 minutes prior to strychnine administration. In doses up to and including 90 mg/kg there was no protection against tonic extension convulsions or death.

D-AMPHETHAMINE AGGREGATION

Protection from d-amphetamine aggregation-induced lethality is usually afforded by alpha-adrenergic blocking agents such as chlorpromazine, phenoxybenzamine, etc. Percent protection was determined and an $ED_{50}$ value calculated. The results are summarized in Table VI.

TABLE VI

| Agent | d-Amphetamine Aggregation $ED_{50}$ mg/kg |
|---|---|
| The hydrochloride | Inactive (100 mg/kg) |
| Chlorpromazine | 1.2 (0.8–1.8) |
| Chlordiazepoxide | Inactive (50 mg/kg) |

The hydrochloride and chlordiazepoxide were inactive in this procedure. Chlorpromazine was very active, probably due in part to the alpha-adrenergic blocking activity of this compound.

ANALGESIA

The hydrochloride was studied for analgesic effect using the Haffner Tail-Pinch method. Mice were preselected for a positive reaction to the noxious stimulus of a continuous tail pinch. Groups of 10 mice each were injected with the hydrochloride i.p. at 50, 75, 100, 150, and 200 mg/kg. Control groups were injected with vehicle and evaluated simultaneously with the experimental groups. Thirty minutes later the tail pinch was applied for 30 seconds and the number of mice responding to the noxious stimulus was recorded. The hydrochloride was active in this assay and the median effective dose was calculated to be 100 mg/kg with 95% confidence limits of 79.5 to 126.0 mg/kg.

DIHYDROXYPHENYLALANINE (DL-DOPA) FIGHTING TEST

It is well known that when monoamine oxidase (MAO) inhibitors are administered prior to the administration of dl-DOPA, which is a noradrenaline precursor, convulsions or excitation occur. In this study, the MAO inhibitor pargyline (80 mg/kg) was given 1, 2 and 4 hours prior to administering 200 mg/kg of dl-DOPA. Results of this experiement are manifested by excitation, salivation, jumping, and fighting. When the hydrochloride (50 – 200 mg/kg), chlorpromazine (5 mg/kg) or chlordiazepoxide (15 mg/kg) were administered instead of pargyline, these symptoms were not observed. Thus, in this procedure, none of the agents tested appears to be an MAO inhibitor.

CARDIOVASCULAR ACTIVITY

The hydrochloride was studied in the pentobarbitalized dog for its possible effects on blood pressure, electrocardiogram, and respiration. The hydrochloride was administered at 1 mg/kg i.v. and then sequentially at 5 mg/kg for a total accumulative dose of 26 mg/kg. The hydrochloride had no consistent effect on blood pressure, respiration or electrocardiogram up to and including 25 mg/kg. There were transient decreases in both systolic and diastolic blood pressures and in respiratory tidal volume, but these were associated with the injections and recovered to control levels several minutes after injection.

TOXICITY

Table VII gives the results of five-day lethality studies following single injections of drug. All values presented represent tests conducted when animals were housed 10 per cage. The hydrochloride was compared with chlorpromazine and chlordiazepoxide. In these and all the preceding calculations, the method of Litchfield and Wilcoxon (*J. Pharmacol. Expt. Ther.* 96: 99, 1949) was used to estimate effective ($ED_{50}$) or lethal ($LD_{50}$) dose.

TABLE VII

| Agent | $LD_{50}$ (95% Confidence Limits) mg/kg | | | |
|---|---|---|---|---|
| | MICE | | RATS | |
| | I.P. | P.O. | I.P. | P.O. |
| The hydrochloride | 245 (215–279.3) | 681 (445–1040) | 322 (178.8–579.6) | 1035 (870–1230) |
| Chlorpromazine | 136 (106–174) | 280 (187–418) | 137 (133–141) | 357.7 (237.7–538.5) |
| Chlordiazepoxide | 400 (265–604) | 810 (688–958) | 265 (224–313) | 392.1 (235.5–753.5) |

These data show that the hydrochloride is less toxic than chlorpromazine but more toxic than chlordiazepoxide when administered to mice. However, when administered to rats it is less toxic than either chlorpromazine or chlordiazepoxide.

The compounds of the present invention, either alone or in the form of a pharmaceutical composition, may be administered to an animal subject in any of a number of forms and via any of several routes. Thus, the compounds or compositions thereof may be orally administered in the form of tablets, pills or capsules, or in the form of a solution or liquid suspension. They may also be administered in the form of a parenteral suspension or solution. The compounds or compositions thereof may also be administered rectally, in the form of a suppository.

When orally administering the compounds or compositions, use can be made of a tablet, pill or capsule consisting entirely of one of the desired compounds, although ordinarily a composition comprising an effective amount of the compound and varying amounts of one or more physiologically inert materials such as carriers, vehicles, binders and the like will be used. Additionally, the compounds may be orally administered in the form of a suspension thereof in a suitable vehicle such as a syrup.

When parenterally administering the compounds or compositions, use may be made of a parenteral solution or suspension of the compounds in a suitable solvent or suspension medium.

The compounds and compositions of the present invention may also be administered rectally in the form of a suppository comprising an effective amount of the desired compound and a suitable vehicle such as petroleum jelly.

The following examples are specific formulations of compositions according to the invention:

EXAMPLE 1

Tablets may be prepared by the compression of a wet granulation containing the following:

| Ingredients | In each |
|---|---|
| N,N-dimethyl-4-phenyl-2-(3-pyridyl)-5-thiazolecarboxamide hydrochloride | 25 mg. |
| Polyvinylpyrrolidone | 6 mg. |
| Lactose | 25 mg. |
| Alcohol, 3A, 200 proof | 1 ml. |
| Stearic acid | 3 mg. |
| Talc | 4 mg. |
| Corn starch | 15 mg. |
| Dosage: 1 tablet 3 times a day. | |

EXAMPLE 2

A liquid suspension for oral administration may be prepared in the following formulation:

| Ingredients | In each 5 cc |
|---|---|
| N,N-dimethyl-4-phenyl-2-(3-pyridyl)-5-thiazolecarboxamide hydrochloride | 25 mg. |
| Sodium Carboxymethylcellulose | 5 mg. |
| Syrup USP q.s. to | 5 cc. |
| Dosage: 1 teaspoonful (5 cc.) every 3 to 4 hours. | |

EXAMPLE 3

Dry filled capsules (DFC) consisting of two sections of hard gelatin may be prepared from the following formulation:

| Ingredients | In each |
|---|---|
| N,N-dimethyl-4-phenyl-2-(3-pyridyl)-5-thiazolecarboxamide hydrochloride | 25 mg. |
| Lactose USP | q.s. |
| Dosage: 1 Capsule 3 times a day. | |

EXAMPLE 4

A parenteral suspension for intra-muscular administration may be prepared in the following formulation:

| Ingredients | In each |
|---|---|
| N,N-dimethyl-4-phenyl-2-(3-pyridyl)-5-thiazolecarboxamide hydrochloride | 5 mg. |
| Isotonic solution (0.85% saline) | 5 cc. |
| Surfactant (a 1% solution of polysorbate 80 USP) | 1 cc. |
| Dosage: Inject 1 cc. when needed. | |

EXAMPLE 5

A suppository capsule may be formulated as below.

| Ingredients | In each |
|---|---|
| N,N-dimethyl-4-phenyl-2-(3-pyridyl)-5-thiazolecarboxamide hydrochloride | 25 mg. |
| Cocoa butter | q.s. |
| Dosage: 1 suppository every 3 to 4 hours. | |

Variations can, of course, be made without departing from the spirit of this invention.

We claim:

1. A method of reducing anxiety in an animal subject, said method comprising administering to an animal subject characterized by the exhibition of anxiety a therapeutically effective amount of a thiazole compound of the formula:

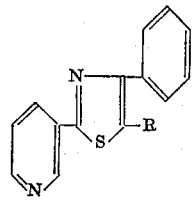

wherein R is

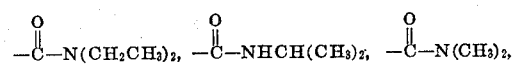

or

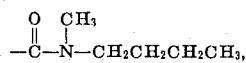

or a pharmaceutically acceptable acid addition thereof.

2. The method of claim 1, wherein said compound or salt is administered to said animal in an orally administrable dosage form.

3. The method of claim 2, wherein said orally administrable dosage form is a pill, tablet or capsule.

4. The method of claim 2, wherein said orally administrable dosage form is a solution or suspension.

5. The method of claim 1, wherein said compound or salt is administered to said animal in a parenterally administrable dosage form.

6. The method of claim 5, wherein said parenterally administrable dosage form is a solution or suspension.

7. The method of claim 1, wherein said compound or salt is administered to said animal in a rectally administrable dosage form.

8. The method of claim 7, wherein said rectally administrable dosage form is a suppository.

9. The method of claim 1, wherein said effective amount is from about 0.1 to about 300 mg/kg of body weight of said animal per day.

10. The method of claim 9, wherein said amount is from about 50 to about 200 mg/kg of body weight per day.

11. The method of claim 9, wherein said amount is from about 0.4 to about 4 mg/kg of body weight per day.

12. The method of claim 1, wherein said thiazole compound is N,N-dimethyl-4-phenyl-2-(3-pyridyl)-5-thiazolecarboxamide hydrochloride.

13. A pharmaceutical preparation in dosage unit form adapted for administration to obtain an anti-anxiety behavior effect comprising an anti-anxiety-effective non-toxic amount within the range from about 0.1 to about 300 mg./kg. of body weight of a compound of the formula:

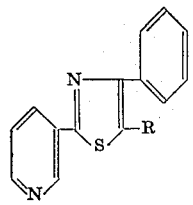

wherein R is

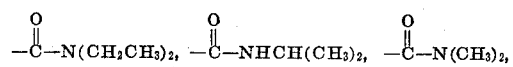

or

or a pharmaceutically acceptable acid addition salt thereof, in combination with a physiologically acceptable carrier or diluent therefor.

14. The composition of claim 13 in an orally administrable dosage form.

15. The composition of claim 14, wherein said orally administrable dosage form is a pill, tablet or capsule.

16. The composition of claim 15, wherein said pill, tablet or capsule comprises 25 to 50 mg of said compound.

17. The composition of claim 14, wherein said orally administrable dosage form is a suspension or solution.

18. The composition of claim 17, wherein said suspension or solution comprises about 5 mg of said compound per cc.

19. The composition of claim 13 in a parenterally administrable dosage form.

20. The composition of claim 19, wherein said parenterally administrable dosage form comprises about 5 mg of said compound per cc of suspension or solution.

21. The composition of claim 13 in a rectally administrable dosage form.

22. The composition of claim 21, wherein said rectally administrable dosage form is a suppository.

23. The composition of claim 22, wherein said suppository contains about 25 to 50 mg of said thiazole compound.

24. The composition of claim 13, wherein said thiazole compound is N,N-dimethyl-4-phenyl-2-(3-pyridyl)-5-thiazolecarboxamide hydrochloride.

25. A method of inducing hypnosis in an animal subject, said method comprising administering to an animal subject capable of undergoing hypnosis a therapeutically effective amount of N,N-dimethyl-4-phenyl-2-(3-pyridyl)-5-thiazolecarboxamide hydrochloride.

26. A pharmaceutical preparation in dosage unit form adapted for administration to obtain a hypnotic effect comprising a hypnotic effective non-toxic amount within the range from about 0.1 to about 300 mg./kg. of body weight of N,N-dimethyl-4-phenyl-2-(3-pyridyl)-5-thiazolecarboxamide hydrochloride in combination with a physiologically acceptable carrier or diluent therefor.

27. A method of relieving pain in an animal subject, said method comprising administering to an animal subject characterized by suffering from pain a therapeutically effective amount of N,N-dimethyl-4-phenyl-2-(3-pyridyl)-5-thiazolecarboxamide hydrochloride.

28. A pharmaceutical preparation in dosage unit form adapted for administration to obtain an analgesic effect comprising an analgesic effective non-toxic amount within the range from about 0.1 to about 300 mg./kg. of body weight of N,N-dimethyl-4-phenyl-2-(3-pyridyl)-5-thiazolecarboxamide hydrochloride in combination with a physiologically acceptable carrier or diluent therefor.

* * * * *